United States Patent
Gu et al.

(10) Patent No.: US 6,358,396 B1
(45) Date of Patent: Mar. 19, 2002

(54) REGENERATION OF ANION EXCHANGE RESINS BY CATALYZED ELECTROCHEMICAL REDUCTION

(75) Inventors: Baohua Gu, Oak Ridge; Gilbert M. Brown, Knoxville, both of TN (US)

(73) Assignee: U. T. Battelle, LLC, Oak Ridge, TN (US)

(*) Notice: Subject to any disclaimer, the term of this patent is extended or adjusted under 35 U.S.C. 154(b) by 0 days.

(21) Appl. No.: 09/566,036

(22) Filed: May 8, 2000

(51) Int. Cl.⁷ .................................................. C02F 1/28
(52) U.S. Cl. ...................... 205/704; 205/688; 210/670; 210/673
(58) Field of Search ............................... 205/688, 704; 210/670, 673

(56) References Cited

U.S. PATENT DOCUMENTS 5,250,162 A   10/1993   Foller et al. ................. 204/140
6,066,257 A * 5/2000   Venkatesh et al. .......... 210/616

OTHER PUBLICATIONS

Damian, Environmental Protection, Jun. 1999, 24, 26–28, 30–31.
Guter, Extended Abstract 218th ACS National Meeting, vol. 39, No. 2 (no date).
Tripp, Extended Abstract 218th ACS National Meeting, vol. 39, No. 2, p. 79 (no date).
Batista, Extended Abstract 218th ACS National Meeting, vol. 9, No. 2, p. 84 (no date).
Urbansky, Bioremediation Journal 2(2):81–95 (1998) (no month).
Abu–Omar et al., Inorg. Chem. 35 7751 (1996) (no month).
Guter, Extended Abstract, 218th ACS National Meeting, vol. 39, No. 2, p. 76 (no date).

* cited by examiner

Primary Examiner—Arun S. Phasge
(74) Attorney, Agent, or Firm—J. Herbert O'Toole; Nexsen Pruet Jacobs & Pollard, LLC

(57) ABSTRACT

Anion exchange resins sorbed with perchlorate may be regenerated by a combination of chemical reduction of perchlorate to chloride using a reducing agent and an electrochemical reduction of the oxidized reducing agent. Transitional metals including Ti, Re, and V are preferred chemical reagents for the reduction of perchlorate to chloride. Complexing agents such as oxalate are used to prevent the precipitation of the oxidized Ti(IV) species, and ethyl alcohol may be added to accelerate the reduction kinetics of perchlorate. The regeneration may be performed by continuously recycling the regenerating solution through the resin bed and an electrochemical cell so that the secondary waste generation is minimized.

15 Claims, 5 Drawing Sheets

REGENERATION OF ANION EXCHANGE RESINS BY CATALYZED ELECTROCHEMICAL REDUCTION

STATEMENT REGARDING FEDERALLY SPONSORED RESEARCH

This invention was made with United States Government support under Contract No. DE-AC05-96OR22464 awarded by the Department of Energy, and the United States Government has certain rights in this invention.

BACKGROUND OF THE INVENTION

1. Field of the Invention

This invention relates generally to the regeneration of anion exchange resins sorbed with perchlorate. More particularly, the invention applies to a combination of electrocatalysis and chemical reduction of perchlorate sorbed on a resin. While still sorbed to a resin, perchlorate anion is reduced to chloride ion that is easily eluted from the resin. In the process, the reduced forms of complexed metals such as Ti(III), V(II), V(III), and rhenium(V) [as $Re(CH_3)O_2$] are oxidized to Ti(IV), V(III), V(IV), and Re(VII) species. These oxidized species are then regenerated by electrochemical reduction and recycled through the resin bed for the further reduction of perchlorate. Complexing agents such as oxalate may be used to complex the reduced and/or oxidized metal species, and organic solvents such as ethanol may be used to enhance the reduction kinetics of perchlorate by Ti(III) species. The chloride ion may be left on the resin or the resin may be treated further to accomodate the desired degree of regeneration required for multiple reuse.

2. Background of the Art

Groundwater or surface water contamination with perchlorate ($ClO_4^-$) is known at numerous locations in the United States and abroad as described by Damian (*Environmental Protection* June 1997, p. 24). The perchlorate anion generally originates as a synthetic contaminant in the environment, primarily from the disposal of solid salts of ammonium or sodium perchlorate used in the explosives and rocket propellant industries. Under both oxygenated and suboxygenated environments perchlorate salts are in the dissociated form of anions, which are highly soluble and mobile in the subsurface aquifer. They may persist for many decades under typical groundwater and surface-water conditions because of perchlorate's low reactivity with other organic or inorganic constituents. Because perchlorate anions are nonvolatile and highly soluble in water, they cannot be removed from water by conventional filtration, sedimentation, or air-stripping methodologies. Selective anion exchange resins (customized resins) are among the preferred treatment technologies for removal of perchlorate because the treatment method is highly efficient and capable of removing these anions to low levels in the presence of high levels of more commonly encountered monovalent anions.

However, the treatment of perchlorate by ion exchange also presents a challenge because of the difficulty in regenerating anion exchange resins saturated with these anions. The increasing order of affinity of singly charged ions for Type I anion exchange resins is well known: bicarbonate<chloride<nitrate<perchlorate. The unusually high affinity between resins and perchlorate requires the use of large quantities of brine solution for the regeneration (Guter, Extended Abstract 218th ACS National Meeting, Vol. 39, No. 2. Pg 76, New Orleans 1999). This translates into high operating cost and environmental waste disposal problems. For example, Tripp and Clifford reported (ibid, 79) that, even with a relatively non-selective anion exchange resin and with counterflow regeneration, it required a large excess of sodium chloride for regeneration: 10 equivalents of chloride for each equivalent of resin exchange sites. With a relatively selective anion exchange resin, Batista et al. (ibid, 84) found that many bed volumes of 12% sodium chloride removed only about 6% of the loaded perchlorate from such a resin. Heating perchlorate-laden strong-base resins during regeneration results in only a small improvement in performance. It was therefore predicted that high operating costs for resin regeneration and regenerant disposal render this ion-exchange technology unattractive unless the two issues of resin regeneration and final waste disposal are resolved.

Highly selective anion exchange resins offer some advantages over conventional nonselective resins in the treatment of perchlorate-contaminated water because of their relatively high efficiency and capacity for the perchlorate species. For example, Oak Ridge National Laboratory has recently developed a new class of bifiuctional anion exchange resins, which are highly selective and efficient for the removal of perchlorate and pertechnetate from contaminated water in the presence of more ubiquitous but less toxic anions such as chloride, nitrate, and bicarbonate (U.S. patent application Ser. No. 08/212,198). However, because perchlorate anions are so strongly sorbed to the bifunctional resins, the conventional regeneration technique by washing with a brine (e.g., 12% sodium chloride) is ineffective.

Because most of these synthetic resins are expensive with a current market price of $400 to $1000 per cubic foot, the resin itself contributes to a major capital cost for the application of ion-exchange technology to remove perchlorate from contaminated water or other liquid streams. Cost-effective regeneration is necessary. U.S. patent application Ser. No. 09/491,242, discloses customized regenerants and sequences of addition addressing this problem.

The redox reaction of Ti(III) aquo ion and perchlorate is known and the kinetics have been reported by Cope et al., J. Chem. Soc. A; 301 (1967). Reduction of perchlorate by the complexed Ti(III) species Ti(III) (HEDTA) was reported by Liu et al., *Inorg. Chem.* 23, 3418 (1984). Both papers reported that chloride ion was the ultimate reduced species, which is nontoxic. However, no studies or reports have been published for the reactions between Ti(III) and perchlorate that was sorbed on the resin, nor the methodology for regenerating the anion-exchange resins by reduction with Ti(III).

The oxidized Ti(IV) species (by reduction of perchlorate) are readily reduced back to Ti(III) species using an electrochemical process as described in, inter alia, U.S. Pat. No. 5,250,162 to Foller et al. However, this electrochemical reduction process has not been applied for the regeneration of anion exchange resins. In particular, organic complexing agents such as oxalate must be utilized in order to prevent the oxidative precipitation of Ti(IV) species within the resin bed.

Abu-Omar et al., *Inorg Chem.* 35, 7751 (1996) described the kinetics of the reduction of perchlorate by methylrhenium dioxide and ascribed the high reactivity of this compound as a reducing agent to its oxophilicity, the stability of the resultant trioxide and the low coordination number of the dioxide. Energetically, methylrhenium dioxide appears to have favorable properties for reduction of perchlorate but practical application has not been reported.

BRIEF SUMMARY OF THE INVENTION

It is an object of this invention to economically regenerate anion exchange resins sorbed with perchlorate. It is a further object of this invention to regenerate perchlorate-loaded anion exchange resins while producing a minimum volume of waste for further treatment. It is yet an additional objective of this invention to regenerate perchlorate-loaded anion exchange resins using a minimal amount of equipment and energy. These and other objects of the invention may be achieved by a combination of chemical reduction of perchlorate to chloride species on the exchange resin by Ti(III) species and electrochemical reduction of Ti(IV) to Ti(III) species in a continuous process.

We have discovered a new method and an electrochemical process for regenerating anion exchange resins loaded with perchlorate. In one aspect of the invention, we use Ti(III) complexed with a water solubilizing chelating agent such as oxalate to reduce perchlorate according to the equation.

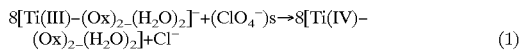
$$8[Ti(III)-(Ox)_2-(H_2O)_2]^- + (ClO_4^-)s \rightarrow 8[Ti(IV)-(Ox)_2-(H_2O)_2] + Cl^- \qquad (1)$$

Ethyl alcohol in the range of 0 to 90% may be added to enhance the reduction kinetics of perchlorate by the Ti(III)-oxalate complexes. In another aspect of the invention, we use the neutral compound $Re(CH_3)O_2$ as a reductant to reduce perchlorate to chloride ions to regenerate the resin. In the first embodiment, the eluate is then passed through an electrochemical cell to reduce the Ti(IV) back to Ti(III) and the eluant is recycled. A relatively small quantity of regenerant is therefore required by this regeneration process because of a continued regeneration and recycle of the Ti(III) reductant through the system. In the case of methylrhenium oxide, the V(II)/V(III)/V(IV) couples are used as catalysts for regeneration of the $Re(CH_3)O_2/Re(CH_3)O_3$ pair at an electrode. The new regeneration process is efficient and cost-effective, while not being subject to difficult-to-maintain operating conditions, nor generating large quantities of secondary wastes.

This invention uses two preferred reductants, complexes of Ti(III)-oxalate and/or the neutral compound $Re(CH_3)O_2$ to reduce perchlorate, while still sorbed to the resin, to chloride ion that is easily eluted from the resin. After a complete reduction of perchlorate, a second regenerant consisting of a dilute acid and sodium chloride is used to elute excess amount of Ti-oxalate or methylrhenium oxide complexes from the resin thereby regenerating the resin. The practice of the invention, therefore, provides a method and an electrochemical reduction process for continuous regenerating the anion exchange resins either in a fixed bed, continuous alternating column, or in a batch process that may be used for removing perchlorate or some other specific anions such as periodate and nitrate from water or other liquid streams. This new regeneration method for anion exchange resins offers an improved regeneration efficiency and waste minimization compared with the conventional chemical displacement technique using sodium chloride brine.

DETAILED DESCRIPTION OF THE INVENTION

Figure 1:
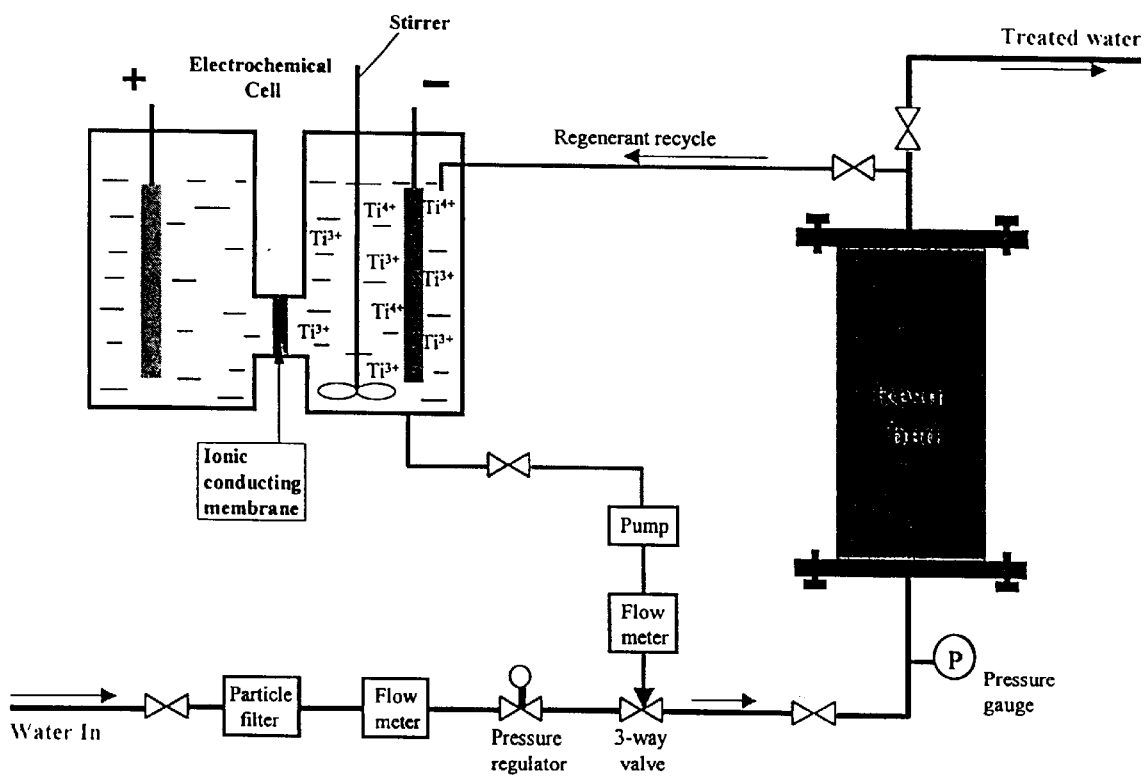
FIG. 1 shows a typical fixed resin bed water treatment and regeneration system according to this invention. When resin bed reaches its adsorption capacity for perchlorate, regeneration switches on by switching off the water treatment line. The regenerant solution containing Ti(III)-oxalate complexes is pumped through the resin bed to reduce perchlorate on the resin. The oxidized Ti(IV)-oxalate complexes are then eluted from the resin bed, reduced again to Ti(III)-oxalate species in the electrochemical cell, and recycled through the resin bed. The potential difference between the anode and cathode is adjusted so that the Ti(IV) complex is continuously reduced to Ti(III) at a diffusion controlled rate.

Resins suitable for the removal of nitrates, perchlorates and pertechnetates, and other large, poorly hydrated anions must be selective, meaning that they must function to remove target anions in the presence of carbonates, bicarbonates, chloride, sulfate, etc. which are present in greater concentrations, but which are considered to be less hazardous at those higher concentrations. The higher selectivity is useful for purification of water at a point of use but becomes a disadvantage when the gross treatment of an aquifer is at issue. For example, perchlorate is strongly and selectively sorbed to a number of (customized) anion exchange resins. Commercial resins such as Sybran Ionac™ SR-6, Purolite™ A520E, and Purolite™ D-3696 and A-530 (two prototype commercial resins based upon bifinctional resins disclosed in U.S. patent application Ser. No. 08/922, 198) have been studied and found to be highly selective for perchlorate anions. The high selectivity of these resins, however, makes regeneration of the resin (sorbed with $ClO_4^-$) a challenging task. No simple salt solution such as 12% brine is capable of displacing $ClO_4^-$ to any significant extent from these resins. We have found that good results may be obtained when a chemical reaction is used to convert $ClO_4^-$ to a species that can be readily eluted. From a thermodynamic standpoint, perchlorate is a highly oxidized species, so a regeneration method based on the reduction of perchlorate to a lower oxidation state of chlorine is a logical approach. However, the problem with this approach is that $ClO_4^-$ is notoriously inert in aqueous solution, and it is not readily reduced by a number of reducing agents ordinarily utilized in environmental remediation including zero-valent ion metal, thiosulfate, and sulfite. Literature reviews[Taube, ACS Symposium Series No. 198, Rorabacher and Endicott eds, 151 (1982), and Urbansky, *Bioremediation* J. 2, 81 (1998)] indicate that $ClO_4^-$ reduction can only occur when it is accompanies by an oxygen atom transfer reaction. This is because the perchlorate anion has no low-lying electronic energy levels available to accept an electron in a single electron transfer process. However perchlorate has been reported to be reduced by several transitional metal ions [such as Ti(III), Re(V), V(III), V(II), Mo(III), and Ru(II)] in aqueous solution. In all cases, the metal ions are capable of accepting an oxygen atom from perchlorate so that the redox reaction is formally an oxygen atom transfer reaction. These reactions can occur in the sense of either a one electron or a two-electron transfer process depending on the characteristics of the reducing agent.

$$ClO_4^- + e^- \rightarrow ClO_3 \qquad (2)$$

$$ClO_4^- + 2e^- \rightarrow ClO_3^- \qquad (3)$$

As stated previously, the kinetics of the reduction of $ClO_4^-$ by the Ti(III) aquo ion has been studied in some detail by Cope [*J Chem. Soc. A*, 301 (1967)]. The reduction of perchlorate by the complex of Ti(III) with the ligand N-(hydroxyethyl)ethylenediamine-N,N',N"-triacetic acid (HEDTA) was investigated by Liu, et al (1984). In both cases the perchlorate is reduced to chloride ion with titanium oxidized to the corresponding Ti(IV) species. This chemistry is an attractive process for resin regeneration since any residual Ti(IV) ions are easily hydrolyzed and precipitated as $TiO_2$ (due to its very low solubility) and would not serve as a contaminant in the water. Furthermore the ultimate reduction product of perchlorate is chloride ion, and this species is readily displaced from the resin if desired. Complexing agents such as oxalic acid, ascorbic acid, and citric acid may be added to prevent the precipitation of Ti(IV) species in the resin bed. Oxalic acid is preferred because of the solubility of the titanium oxalate complexes regardless of the oxidation state of the titanium. It has been established that two oxalate groups are bound to Ti(III) in the presence of a large excess of oxalic acid, creating the net anionic complex $[Ti(C_2O_4)_2(H_2O)_2]^-$ which should be electrostatically attracted to the positively charged exchange sites of the resin. The oxidized form, Ti(IV) is also complexed by oxalate preventing the premature precipitation of this species in the micropores of the resin beads.

Figure 2:
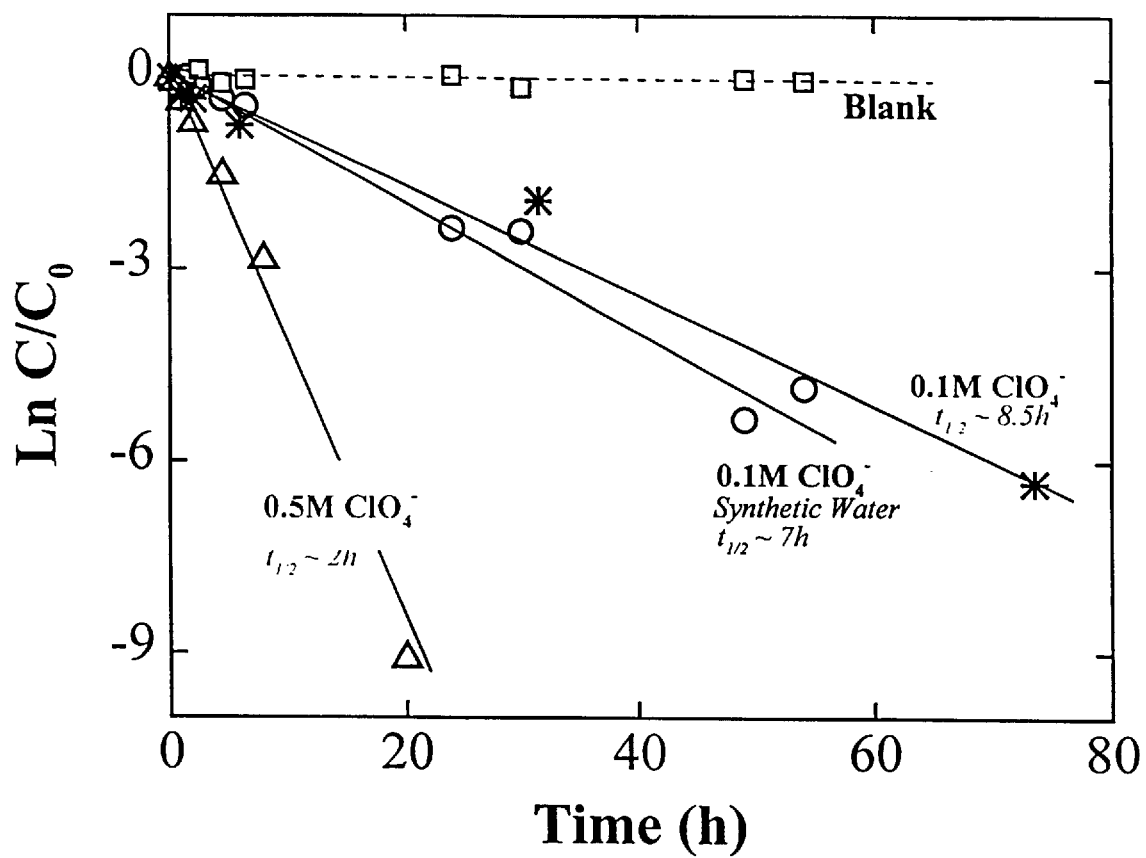
FIG. 2 illustrates the reactions between $ClO_4^-$ and Ti(III)-oxalate complexes in 0.2 M oxalic acid under nitrogen purge in a bulk solution. Ti(III) is oxidized quickly to Ti(IV) species by perchlorate; the reaction half life depends on the initial perchlorate concentration and ranges from ~2 h to 8.5 h. Note that the synthetic test water consists of 3 mM $NaHCO_3$, 1 mM $CaCl_2$, 0.5 mM $MgCl_2$, 0.5 mM $Na_2SO_4$, and 0.5 mM $KNO_3$.

Reactions between $ClO_4^-$ and Ti(III)-oxalate complexes (0.02 M) were performed in our bench-scale experiments containing 0.1M or 0.5M $ClO_4^-$ in 0.2M oxalic acid under continuous $N_2$ purging. In both of these systems, an excess amount of $ClO_4^-$ was added, and the rate of the reaction with Ti(III) was monitored by following the change in UV absorbance at 400 nm. It was observed that Ti(IV) species are produced in the absence of nitrogen, as evidenced by an UV absorption at approximately 300 nm. Under nitrogen (or other inert gas), Ti(III)-oxalate complexes have been found to be quite stable. Results (FIG. 2) indicated that the reduction of $ClO_4^-$ in homogeneous solution by Ti(III) oxalate complexes followed pseudo-first order rate kinetics, i.e., $$\text{Rate} = k[Ti(III)][ClO_4^-] \qquad (4)$$

Figure 3:
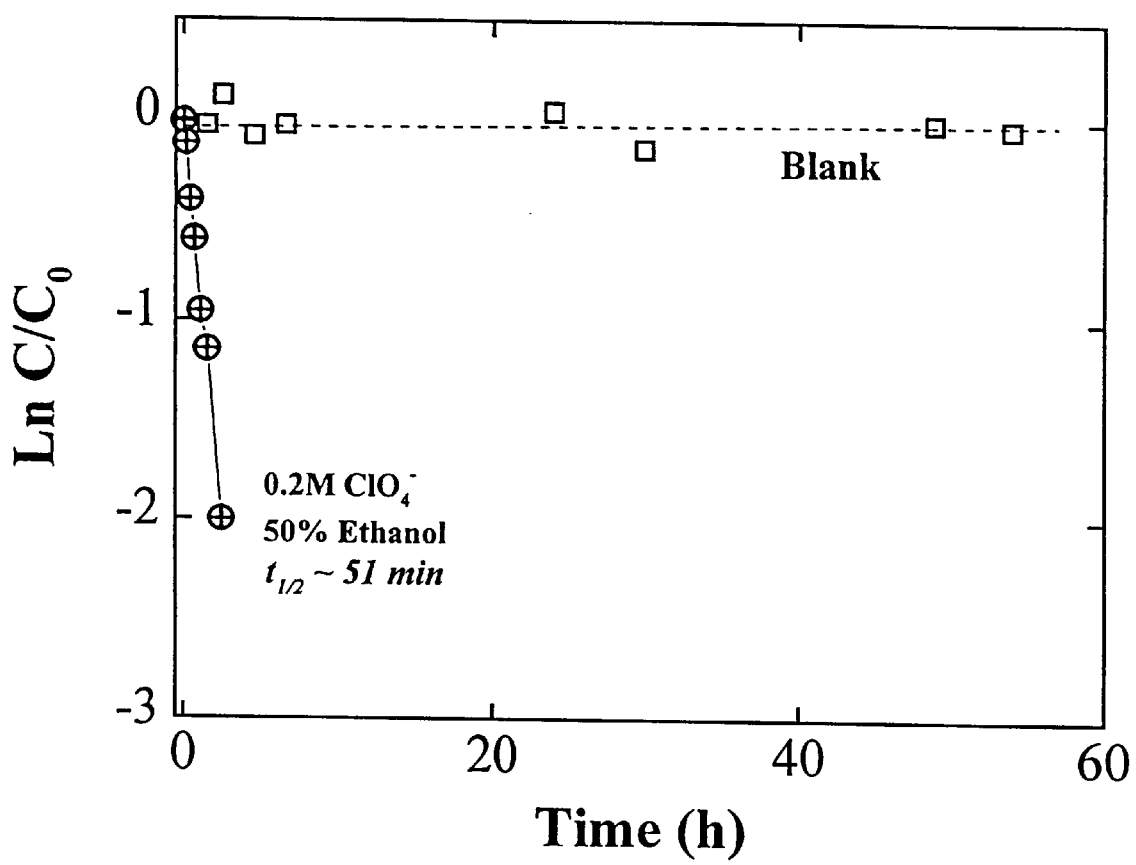
FIG. 3 illustrates the reactions between $ClO_4^-$ and Ti(III)-oxalate in 0.2 M oxalic acid under nitrogen purge in the presence of 50% ethanol, which enhances the reaction kinetics or shortened the reaction half-life to <1 h.

A plot of $\ln(C/C_0)$ vs reaction time yields a straight line at different $ClO_4^-$ concentrations. Reaction half-lives ranged from approximately 2 h to approximately 8.5 h in 0.5M and 0.1M $ClO_4^-$ solutions. In synthetic groundwater solution (a laboratory standard intended to duplicate average field samples), the reaction rate appeared to be similar or slightly faster, probably because of the presence of nitrate in field samples which also reacts with Ti(III). In the presence of 50% ethyl alcohol, the reaction kinetics are greatly enhanced, and the reaction half-life reduced to <1 h (FIG. 3). The end products of these reactions are $Cl^-$ anions and a Ti(IV)-oxalate complex.

The regeneration of Ti(III) from Ti(IV) by controlled potential electrolysis can be performed in an electrochemical cell in the regeneration loop as illustrated in FIG. 1. As an example, a solution containing Ti(IV) at a concentration of 0.02M, complexed by oxalate (0.5M) in 0.6M sulfuric acid, was reduced electrochemically at a platinum electrode (−0.40V vs the SCE reference electrode) and at a current dependent on the surface area to volume ratio of the electrode-cell combination. The regenerated Ti(III) was recirculated through a highly selective anion exchange resin column (Purolite™ D-3696) loaded with $ClO_4^-$. Any Ti(IV) was continuously reduced back to Ti(III) in the electrochemical cell. After circulating the Ti(III)-oxalate solution for about 2–5 days, the resin bed was washed with 1M HCl and followed by a wash with purified water. The resin column was then subjected to $ClO_4^-$ breakthrough test again in a laboratory accelerated (high perchlorate concentration) experiment using a 10×22 mm column at a constant flow rate of ~30 mL/min. The $ClO_4^-$ concentration of the feed solution was 10 mg/L. The regeneration experiment was duplicated. Results indicated that although the breakthrough curve did not exactly match the initial breakthrough curve, the regenerated resin performed very well in removing $ClO_4^-$. Because of the continuous regeneration of Ti(III) a relatively small amount of Ti(III) is needed to reduce a large amount of perchlorate in the resin bed.

Figure 4:
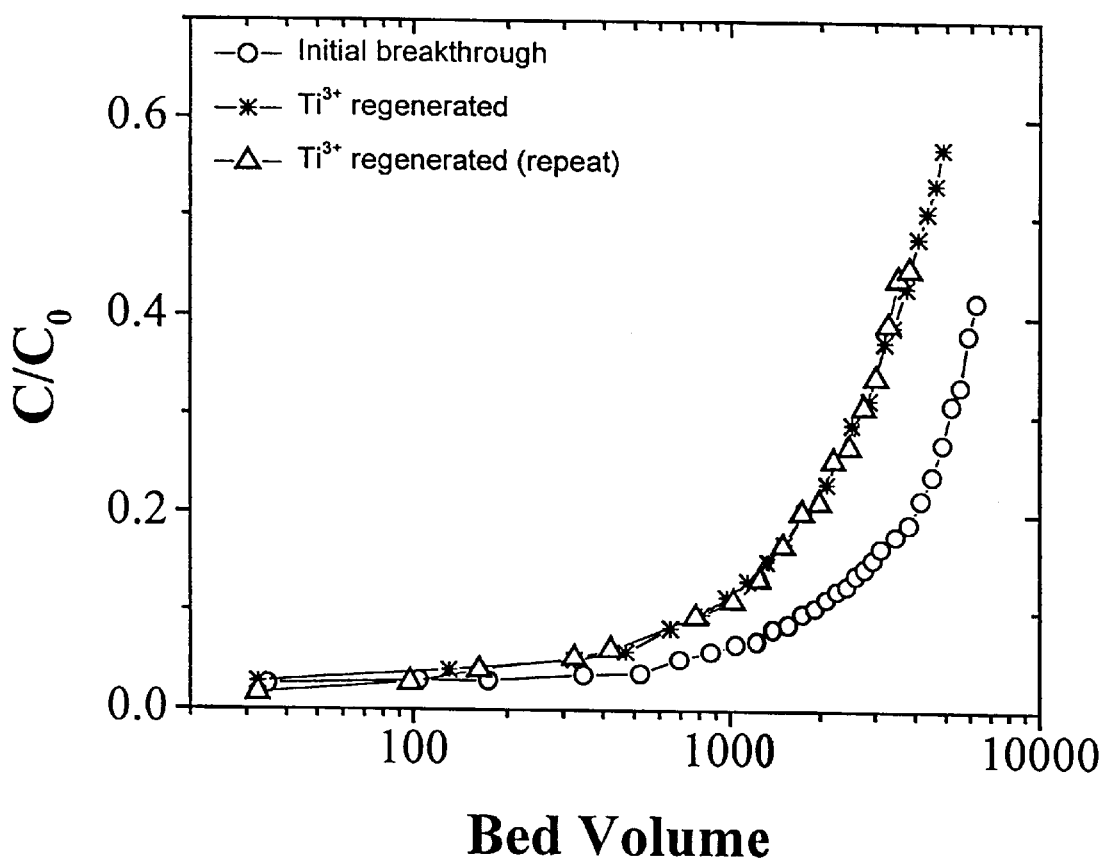
FIG. 4 illustrates the performance of the Purolite™ D-3696 resin before and after regeneration (twice) using the Ti(III)-oxalate electrochemical reduction technique. The data shows the perchlorate breakthrough ($C/C_0$) in a small packed column (10×22 mm) running at 30 mL min$^{-1}$ in the laboratory. The $C/C_0$ is the ratio of effluent perchlorate concentration versus the initial influent concentration of 10 mg L$^{-1}$ in a synthetic test solution (consisted of 3 mM $NaHCO_3$, 1 mM $CaCl_2$, 0.5 mM $MgCl_2$, 0.5 mM $Na_2SO_4$, and 0.5 mM $KNO_3$). Results indicate a >70% regeneration of the exchange sites on the resin bed.

To ensure a complete reduction of $ClO_4^-$ sorbed on the resin beads, a relatively long reaction time (approximately 2–5 days) was used in our experiment. Additional time also is required to wash the excess amount of Ti(IV)-oxalate complexes present in the resin bed during regeneration. Therefore, each regeneration cycle (for column prototype studies) required approximately one week. We have demonstrated repeatedly regeneration efficiencies >70% of the initial sorption sites on the resin beads (FIG. 4).

In addition to Ti(III), the reduction of perchlorate may be performed in analogous systems including V(III), V(II), Mo(III) and Ru(II) in aqueous solutions. All of these species are capable of accepting an oxygen atom from the perchlorate so that redox reaction remains formally an oxygen atom transfer reaction. Either one or two electron processes may be observed. Of particular interest from an efficiency standpoint is the reaction of methylrhenium dioxide ($CH_3ReO_2$) which has been shown to react rapidly with perchlorate, halite, and perrhenate ions to abstract oxygen atoms. [Abu-Omar et al., *Inorg. Chem.*, 34, 6239(1995); ibid, 35, 7751, (1996)]. The oxidation kinetics of the Re(III) to Re(VI) are approximately 4 orders of magnitude faster than the Ti redox rates. The net reaction is a reduction of perchlorate to chloride wherein the first step involving reduction of perchlorate to chlorate is rate limiting.

$$4CH_3ReO_2 + ClO_4^- \rightarrow 4CH_3ReO_3 + Cl^- \qquad (5)$$

Because of its faster reaction kinetics with $ClO_4^-$, an order of magnitude lower concentration of the Re complex than the Ti(III) species will still result in a faster regeneration process. Furthermore, the conversion of $CH_3ReO_3$ back to $CH_3ReO_2$ can be accomplished by an electrochemical process that would allow the amount of rhenium to be held to a minimum. The electrochemical reduction of Re(IV) to Re(II) is accomplished and catalyzed by the electrochemical reactions of the V(II)/V(III)/V(IV) couples.

$$4Re(Me)O_2 + ClO_4^- \rightarrow 4Re(Me)(O)_3 + Cl^- \qquad (6)$$

$$Re(Me)(O)_3 + V(II) \rightarrow Re(Me)O_2 + V(IV) \quad (7)$$

$$V(IV) + V(II) \rightarrow 2V(III) \quad (8)$$

$$V(III) + e^- \rightarrow V(II) \quad (9)$$

The V(II)/V(III)/V(IV) redox couples are aquo or oxo species under the condition of the reaction. Vanadium in oxidation state (II) has been shown by Abu-Omar et al. to reduce the rhenium trioxide species to the dioxo species, resulting in V(IV). However V(IV) is well known to react rapidly with V(II) to form two equivalents of V(III). This latter species is reduced at an electrode to form V(Il) (K. J. Vetler, 1967. In *Electrochemical kinetics: theoretical and experimental aspects.* Academic Press, NY. p500).

The obvious advantage of using the Re species is more rapid recovery of the column for a given volume of regeneration solution. The disadvantage is the comparative cost of methylrhenium dioxide versus titanium oxalate. As the number of columns being used to treat contaminated aquifers is increased, the economic benefit available from the use of the rhenium compounds becomes pronounced. Redox regeneration of columns is much preferred in the long term to expensive elution protocols and their higher volume of waste product. Total regeneration during each cycle is not required provided that the regenerated column is efficient and has suitable capacity for use in the designed treatment system.

Suitable methods for conducting the resin regeneration are those resulting in intimate contact between the regenerant liquid and the resin in a recycled system. Examples of suitable methods include concurrent or countercurrent fixed beds or columns, fluidized beds, stirred tanks, and batch tanks. The contact may occur batchwise, semi-batchwise, continuously, or semi-continuously. Preferably, the regenerant is contacted with the anion exchange resin in a pumped continuous recycle system employing a packed ion-exchange column and an electrochemical cell (as shown in FIG. 1 to reduce manipulations).

The time required for contact will depend upon numerous factors, such as: (1) the properties of the anion exchange resin employed; (2) temperature at which the contact is conducted; (3) the concentration of the regenerant; (4) the degree of regeneration desired. In general, the temperature is only limited by the freezing point and boiling point. Although ambient temperature (about 20° C.) is preferred, a higher temperature favors the regeneration and therefore reduces the time required for regeneration. In general, the temperatures from about 5 to about 80° C. are suitable. The application of this invention will be described in terms of the following examples, which illustrate but do not limit the scope of the invention:

EXAMPLE 1

Figure 5:
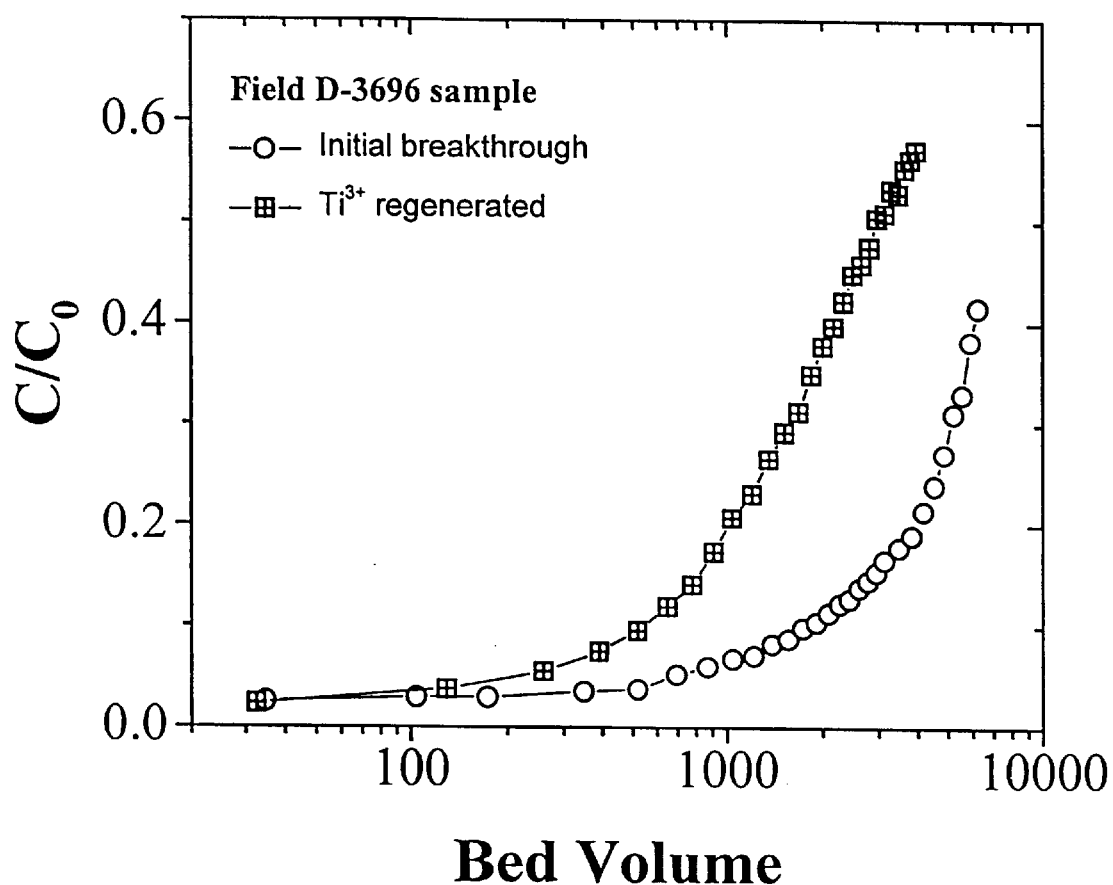
FIG. 5 illustrates breakthrough curves before and after regeneration for the Purolite™ D-3696 resin, which had been used for groundwater treatment for perchlorate at a field site in northern California and was a subsample from the field column. Other experimental conditions were the same as illustrated in FIG. 4.

A solution containing Ti(IV) at a concentration of 0.02M, complexed by oxalate (0.5M) in 0.6M sulfuiric acid, was reduced electrochemically at a platinum electrode (−0.04 Vs the SCE reference electrode). Regeneration of Ti(III) took place within 2 hours. This Ti(III)-oxalate solution was circulated through a bifunctional resin column (Purolite D-3696), 10 mm×22 mm, which had been previously loaded with $ClO_4^-$ to breakthrough. Any Ti(IV) in the circulated liquid was continuously reduced back to Ti(III) in the electrochemical cell. After circulating the Ti(III)-oxalate solution for about 3 days, the resin column was washed with 1M HCl and followed by a wash with purified water. The resin column was then subjected to $ClO_4^-$ breakthrough test again in laboratory accelerated experiment using the same 10×22 mm column at a constant flow rate of ~30 mL/min. The $ClO_4^-$ concentration of the feed solution was 10 mg/L. This process was then repeated again. Results (FIG. 4) indicted that, although the breakthrough curve did not exactly match the initial breakthrough curve, the procedure regenerated ~70% of the initial sorption sites in the resin beds. This same process was repeated with a different column and results were similar (FIG. 5).'

Another column regeneration study was performed using the same resin, which was subjected to field treatment of the perchlorate-contaminated groundwater in Northern California before regeneration. The regeneration cycle took approximately 1 week. Additionally, a mixture of 0.6M oxalic acid and 0.5M $H_2SO_4$ was used to condition the resin column before or after an input of Ti-oxalate complexing solution to avoid a direct contact of a Ti-containing solution with oxygenated water containing no complexing agent (to prevent the oxidative precipitation of $TiO_2$). Results (FIG. 5) again provided the proof-of-principal of this novel regeneration process.

We claim:

1. A method for the regeneration of a strong-base anion exchange resin sorbed with perchlorate ($ClO_4^-$) comprising:
    addition of an aqueous complexed metal reducing agent selected from the group consisting of Ti(III) and Re(V) to convert perchlorate to chloride;
    eluting the column with a dilute acid; and
    optionally eluting the column with a solution of NaCl.

2. A method according to claim 1 wherein the complexed metal reducing agent is complexed with a chelating agent selected from the group consisting of oxalic acid, EDTA, citric acid and DTPA.

3. A method according to claim 2 wherein the chelating agent is oxalic acid in a concentration of 10 mM to 2 M.

4. A method according to claim 1 wherein the complexed metal reducing agent is provided in an aqueous solution further containing an acid and an organic solvent.

5. A method according to claim 4 wherein the organic solvent is selected from the group consisting of methanol, ethanol, isopropanol, glycols and glycol ethers.

6. A method according to claim 5 wherein the organic solvent comprises up to 90% of the aqueous solution.

7. A method according to claim 4 wherein the acid is selected from the group consisting of sulfuric acid, hydrochloric acid and phosphoric acid.

8. A method according to claim 7 wherein the acid in the aqueous solution is in a concentration of 1 mM to 3 M.

9. A method according to claim 1 wherein the reducing agent is a Ti(III) compound present in a concentration of 1 mM to 1 M.

10. A method according to claim 1 wherein the complexed reducing agent is a Re(V)$MeO_2$ compound present in a concentration of 0.1 mM to 0.2 M.

11. A method according to claim 10 wherein a vanadium (II)/vanadium(III)/vanadium(IV) couple is used to catalyze the reduction of Re(VII) to Re(V) species.

12. A method according to claim 11 wherein the vanadium catalyst is present in a range of 0.1 mM to 0.2M.

13. A method according to claim 1 which is performed in an anoxic system.

14. A method according to claim 1 wherein the dilute acid used to elute the column is hydrochloric acid.

15. A method according to claim 1 further comprising regenerating the reduced form of the catalyst in an electrochemical cell.

* * * * *